United States Patent [19]

Shimizu

[11] 4,333,000
[45] Jun. 1, 1982

[54] APPARATUS FOR MAKING HOLLOW EXTRUSION DIES

[75] Inventor: Akihiko Shimizu, Kawasakishi, Japan

[73] Assignee: Japax Inc., Kawasaki, Japan

[21] Appl. No.: 175,009

[22] Filed: Aug. 4, 1980

[30] Foreign Application Priority Data

Aug. 8, 1979 [JP] Japan .................... 54-100229

[51] Int. Cl.³ .................................. B23P 1/02
[52] U.S. Cl. ........................ 219/69 W; 219/69 M
[58] Field of Search ............... 219/69 W, 69 M, 69 R

[56] References Cited

U.S. PATENT DOCUMENTS 2,927,190  3/1960  Dulebohn et al. ............... 219/69 M

FOREIGN PATENT DOCUMENTS 2303842  8/1974  Fed. Rep. of Germany ... 219/69 W
2816588 10/1978  Fed. Rep. of Germany ... 219/69 W

*Primary Examiner*—C. C. Shaw
*Attorney, Agent, or Firm*—Karl F. Ross

[57] ABSTRACT

An apparatus for making a hollow extrusion die set consisting of male and female die member with their respective shaped male and female bearing surfaces spaced apart and in a predetermined mating relationship from solid male and hollow female die blanks (6,11), respectively, is provided comprising: a wire-cut EDM electrode head assembly (1) having a plurality of wire guide members (1c, 1d) for spanning and axially transporting a continuous wire electrode (3) in a fixed U form path including a predetermined stretch (3a) of the axially transported wire electrode (3) constituting an axially moving EDM wire-cutting edge for the male and female die blanks (6, 11); a first jig member (5) for securely and interchangeably mounting the male and female die blanks (6, 11) in a predetermined and fixed relative position thereon; a worktable (4) for securely mounting the first jig member (5) thereon and being displaceable relative to the wire-cut EDM electrode head assembly (1); and a second jig member (7) for securely mounting on the male die blank (6) when the latter is securely mounted on the first jig member (5) in the predetermined position for providing a reference surface to be engaged by the predetermined stretch (3a) of the axially transported wire electrode for machining the male and female die blanks in the fixed relative position.

7 Claims, 4 Drawing Figures

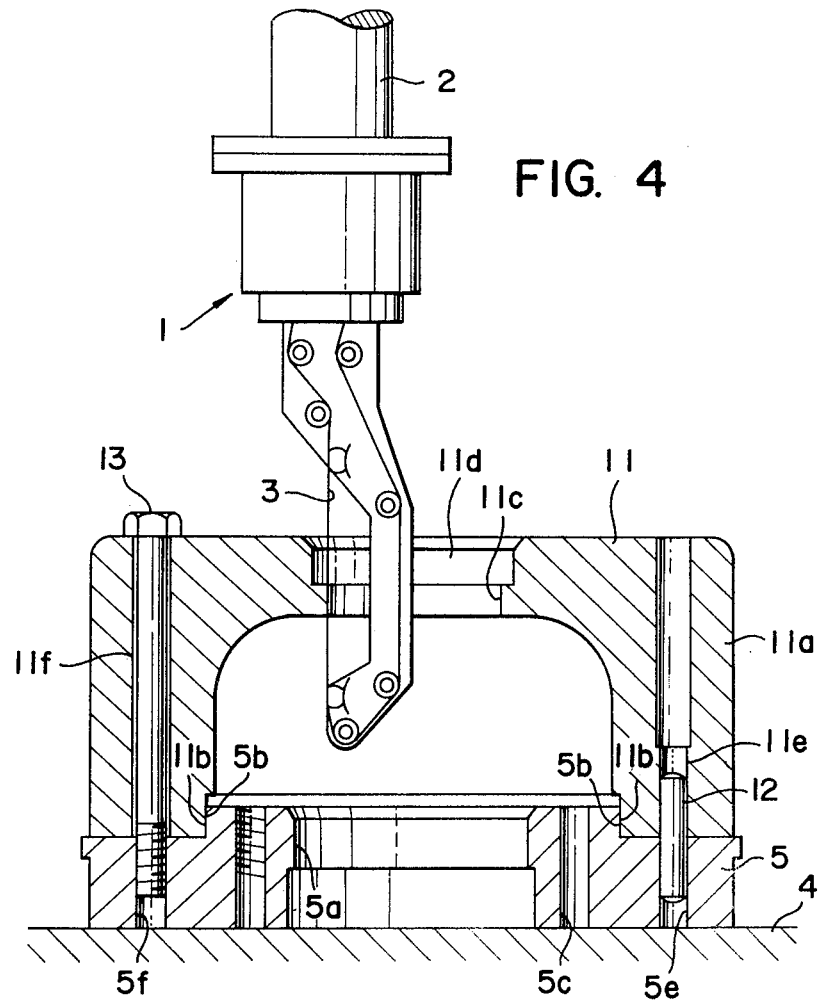

APPARATUS FOR MAKING HOLLOW EXTRUSION DIES

FIELD OF THE INVENTION

The present invention relates to an apparatus for making mating male and female die members in a hollow die set to be used for extrusion-forming various sorts of tubing, aluminum sashes, frames and other products. More particularly, the invention relates to an apparatus for making a hollow extrusion die set by wire-cut electrical discharge machining. (WC-EDM).

BACKGROUND OF THE INVENTION

A hollow extrusion die set commonly consists of a hollow female die member and a solid male die member which are mated together to form spaced-apart extrusion bearing surfaces shaped to determine the sectional shape and dimension of extrusion-formed products.

It is known that solid extrusion die sets are efficiently and economically machined by an existing numerical controlled WC-EDM machine. The art has recognized heretofore that hollow extrusion die sets, however, are not effectively machinable by these machines. Thus, a hollow extrusion die set has hitherto been prepared only by the extremely complex and costly procedure which includes the step of pre-machining the male and female die blanks separately by electrochemical machining (ECM) or electrical discharge machining (EDM) of the cavity-sinking type, followed by the steps of assembling the separately machined die blanks, heat-treatment, grind-finishing the bearing surface again by EDM and finally hand-finishing to a desired precision and final finish. Not only does the conventional practice of making a hollow extrusion die set entail numerous steps which are complicated but it is quite problematical in that it requires the provisional assembling of the rough-machined die blanks before heat-treatment and necessitates one or more electrodes for EDM operations to provide the intricate bearing surfaces. Furthermore, in a cavity-sinking type EDM process, a completely straight cut is not obtainable and a taper is unavoidably left on the bearing surfaces. This entails repeated inspection and redressing steps and makes it difficult to provide separate sets of dies which can be interchanged.

OBJECTS OF THE INVENTION

It is, accordingly, a principal object of the present invention to provide an improved apparatus for making a hollow extrusion die set whereby the difficulties and problems encountered in conventional practice are overcome.

Another object of the invention is to provide an improved technique for making a hollow extrusion die set whereby die blanks can be previously heat-treated and subsequently machined into a desired form and mating set readily with due precision and finish.

A further object of the invention is to provide an apparatus for making a hollow extrusion die set which is simple and yet allows die blanks to be readily machined into the desired die set with an extremely high accuracy and surface finish economically.

SUMMARY OF THE INVENTION

In accordance with the present invention there is provided a wire-cut EDM apparatus for making a hollow extrusion die set consisting of a male and female die member formed with the respective (male and female) bearing surfaces spaced apart with a predetermined gap spacing in a predetermined mating form and relationship, from a male and a female die blanks, respectively. The apparatus includes a worktable and makes use of a wire-cut EDM electrode assembly as generally disclosed in U.S. patent application Ser. No. 897,053 filed Apr. 17, 1978 (now U.S. Pat. No. 4,307,279 issued Dec. 22, 1981), the assembly being movable relative to the worktable and having a plurality of wire guide members for spanning a continuous wire electrode in the path which is of generally U form at an end portion thereof and permitting the wire electrode to axially travel along the U form path including a predetermined stretch of traveling wire constituting an axially moving wire-cutting edge.

In accordance with the invention, the apparatus is provided for making a hollow extrusion die set of mating male and female die members from male and female die blanks, respectively. The male die blank comprises a block having a central boss which in turn has (near the top thereof) a flange portion to be shaped to form the male bearing die surface by the aforementioned axially moving wire cutting edge of the wire-cut EDM electrode head assembly. The female die blank comprises a cup-shaped block having a central opening whose annular edge is to be shaped to form the female bearing die surface by the axially moving wire-cutting edge of the wire-cut EDM electrode head assembly.

In accordance with the present invention, the apparatus for making a hollow die set consisting of a male and female die members with their respective male and female die bearing surface spaced apart from each other in a predetermined shaped and mating relationship, from a solid male and a hollow female die blanks, respectively, comprises: a wire-cut EDM electrode head assembly having a plurality of wire guide members for spanning and axially transporting a continuous wire electrode in a fixed path of generally U form at an end portion of the assembly, the path including a predetermined stretch of the axially transported wire electrode constituting an axially moving EDM wire-cutting edge for the male and female die blanks; a first jig member for securely and interchangeably mounting the male and female die blanks in a predetermined and fixed relative position thereon; a worktable for securely mounting said first jig member thereon, the worktable being displaceable relative to the wire-cut EDM electrode head assembly; and a second jig member for securely mounting on the male die blank when the latter is securely mounted on the first jig member in the predetermined position for providing a reference surface to be engaged by the predetermined stretch of the axially transported wire electrode for machining the male and female die blanks in the fixed relative position.

The wire-cut EDM electrode assembly may include a carriage and an arm rotatably mounted to the carriage about an axis which is coincident or in parallel with the axis of the predetermined stretch of the axially transported wire electrode, the arm having the wire guide members secured thereon.

The male die blank is typically in the form of an annular block having a base flange and a columnar base centrally projecting therefrom, the boss being formed near its top with an outwardly projecting annular flange to be shaped by the wire-cut EDM electrode head assembly to provide the male die bearing surface. The female die blank is then typically in the form of a cup-shaped block having a cylindrical portion extending downwardly and at its top portion a circular opening formed with an inwardly projecting annular rim to be machined by the wire-cut EDM electrode head assembly to provide the female die bearing surface.

The first jig member may include a disk or plate-form base and a central projection and the second jig member may be in the form of a cup-shaped block having a cylindrical portion extending downwardly and at its top portion an annular opening defined by a circular wall constituting the reference surface, the upper rim of the projection of the first jig member being shaped so as to be snugly fitted with the lower end of the cylindrical portion of the second jig member and with the lower end of the cylindrical portion of the female die blank.

The upper rim of the flange of the male die blank is shaped so as to be snugly fitted with the lower end of the cylindrical portion of the female die blank and with the lower end of the cylindrical portion of the second jig member.

The first jig member may be formed vertically through the projection with at least one first hole and the male die blank may then be formed vertically through its flange portion with at least one second hole, the first and the second holes being adapted to be registered with each other and anchored together by a pin. The first jig member is then formed vertically through its base portion with at least one further first hole and the female die blank formed vertically through its cylindrical portion with at least one third hole, the further first hole and the third hole being adapted to be registered with each other and anchored together by a pin.

BRIEF DESCRIPTION OF THE DRAWING

A certain exemplary form of the apparatus of the present invention and the method of using the same for making a hollow extrusion die set will be described hereinafter with reference to the accompanying drawing in which:

FIG. 4 is a diagrammatic and essentially sectional view in elevation illustrating the step of machining the female die blank mounted on the first jig member with the wire-cut EDM electrode head assembly in accordance with the present invention.

SPECIFIC DESCRIPTION

Figure 1:
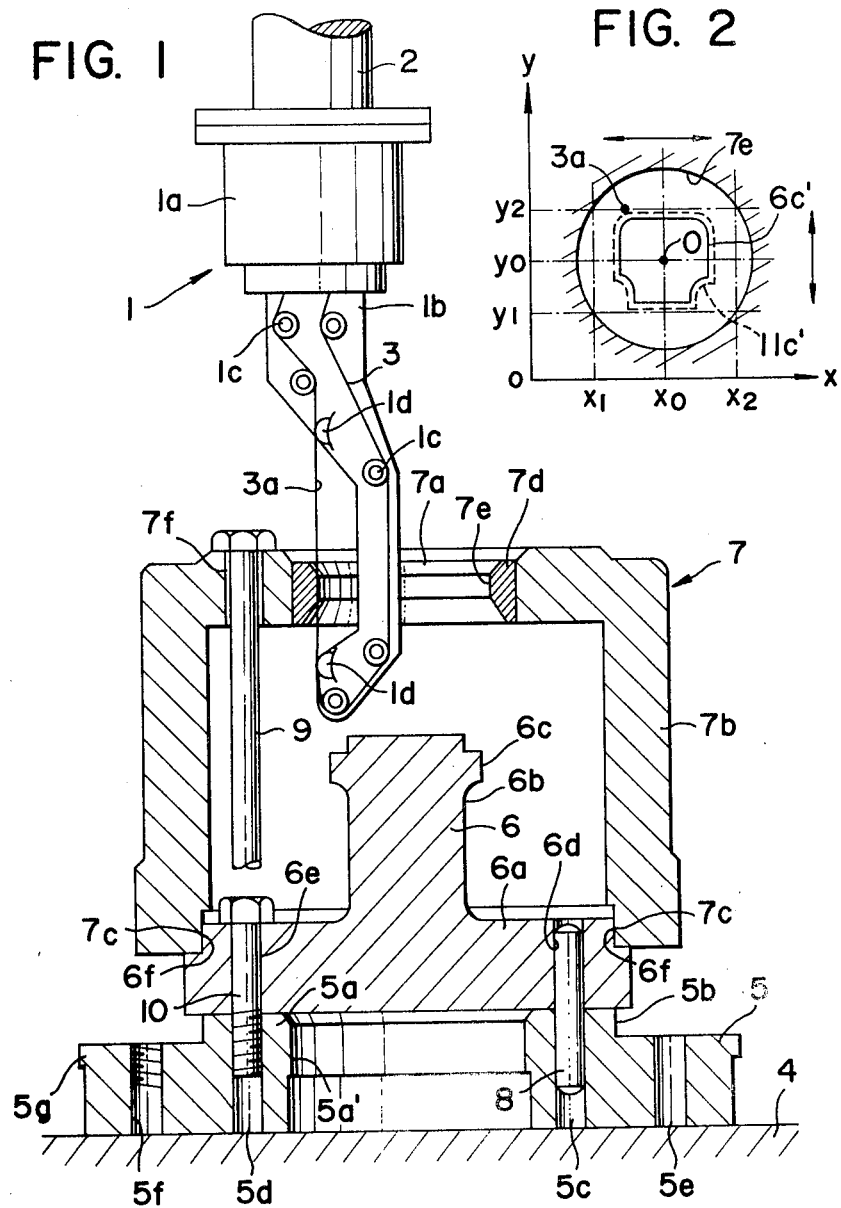
FIG. 1 is a diagrammatic and essentially sectional view in elevation illustrating a wire-cut EDM electrode head assembly, a male die blank and a first and second jig members constructed and assembled together in accordance with the present invention.

Referring to FIG. 1, a wire-cut EDM apparatus embodying the present invention comprises a wire electrode head assembly 1 carried by a stem 2, a continuous wire electrode 3 carried on the assembly 1, a worktable 4, a first jig member 5 securely mounted on the worktable 4 and in the form of a plate or disk having a bored central projection 5a on which is shown mounted a male die blank 6, and a second jig member 7 which is cup-shaped and shown mounted on the male die blank 6.

The wire electrode head assembly 1 has a carriage 1a detachably secured to the stem 2 which is carried to be vertically movable by a machine head (not shown), an arm 1b generally in a goose-neck form and secured to the carriage 1a and a plurality of rotary and sliding wire guide members 1c and 1d secured to the arm 1b for holding the wire 3 in such a manner that the wire is spanned and allowed to travel axially generally in a U shaped path on the assembly 1 at an end or lower portion thereof as shown. The wire electrode 3 is continuously fed from a supply reel or the like (not shown) and collected onto a take-up reel or the like (not shown) and driven at a predetermined rate of axial travel by the action of a traction and brake motors (not shown) drivingly connected to traction and brake rollers (not shown), respectively at the take-up and supply sides. These reels, motors and rollers may be provided on an upper portion of the arm 1b or on the carriage 1a, or alternatively on a machine column (not shown) supporting the machining head which carries the stem 2.

In the U form wire travel path there is defined between the pair or sliding guides 1d a wire-cut EDM machining zone or a traveling wire stretch 3a which constitutes an axially moving EDM cutting edge.

Figure 2:
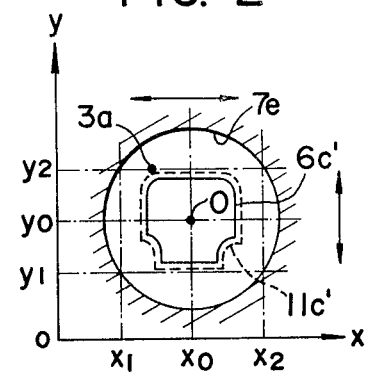
FIG. 2 is a cross-sectional view illustrating the relationship of the reference surface of the second jig member arranged and the male and female die bearing surface machined in accordance with the present invention.

The male die blank 6 has its annular flange portion 6a and a columnar boss 6b centrally projected therefrom and formed near its top with an annular flange 6c to be machined to provide a male die bearing surface 6c' as shown in FIG. 2. The male die blank 6 is formed vertically through its flange portion 6a with a plurality of first holes one of which is shown at 6d for receiving a pin 8 and with a plurality of second holes one of which is shown at 6e for receiving a bolt 10. The flange 6a has a shaped annular indentation 6f along its upper rim.

A cup-shaped female die blank is shown at 11 in FIG. 4 and has a cylindrical portion 11a extending downwardly and along the inner edge of its lower end an annular indentation 11b shaped to be snugly fitted with the indented rim 6f of the male die blank 6 (FIG. 1). The cup-shaped female die blank 11 has at its top portion an annular opening 11d formed with an inwardly projected annular wall 11c to be machined to provide a female die bearing surface 11c' as shown by the broken line in FIG. 2. The female die blank 11 is also formed vertically through its cylindrical wall 11a with a plurality of first holes one of which is shown at 11e for receiving a pin 12 and with a plurality of second holes one of which is shown at 11f for receiving a bolt 13.

Referring back to FIG. 1, the cap-shaped jig member 7 like the female die blank 11 of FIG. 4 has at its top an annular opening which is designated at 7a and has a cylindrical portion 7b extending downwardly and along the inner edge of its lower end an annular indentation 7c shaped to be snugly fitted with the indented rim 6f of the male die blank 6. The top opening 7a of the jig member 7 has an annular sleeve or shaped ring d detachably attached thereto. A plurality of such sleeves or ring 7d may be provided, one or another of which is selectively used. The sleeve or ring 7d provides a reference opening 7e which is also shown sectionally in FIG. 2. The cup-shaped jig member 7 is further formed vertically through its top wall with a plurality of tapped holes one of which is shown at 7f for receiving a bolt 9.

Figure 3:
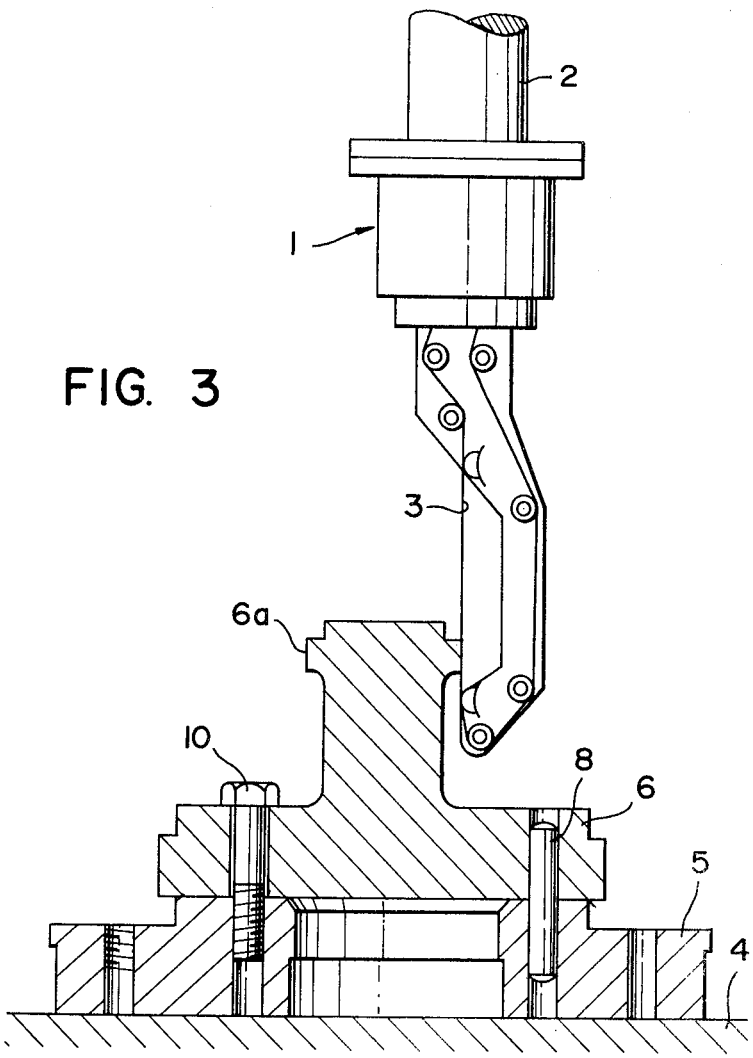
FIG. 3 is a diagrammatic and essentially sectional view in elevation illustrating the step of machining the male die blank mounted on the first jig member with the wire-cut EDM electrode head assembly in accordance with the present invention.

With reference to FIGS. 1, 3 and 4, the plate- or disk-form jig member or block 5 which may be mounted on the worktable 4 securely by means of any known clamp or T-form bolts has the central projection 5a which is annular and defined with a bore 5a' which is coaxial therewith. The annular projection 5a has its upper outer rim 5b shaped to be snugly fitted into the indented upper edge 11b at the lower end of the cut-shaped die blank 11 as shown in FIG. 4. The block 5 is also formed vertically through its annular projection 5a with a plurality of first holes one of which is shown at 5c and a plurality of second and threaded holes one of which is shown at 5d. The holes 5c and 5d are located so that when the male die blank 6 is properly mounted on the jig member 5, they are registered with the holes 6d and 6e, respectively. Then the pins 8 are inserted into the registered holes 6d and 5c to anchor the male die blank 6 onto the jig member 5 and the bolts 10 are inserted and threaded into the registered holes 6e and 5d to clamp the anchored blocks 5 and 6 together.

The jig block 5 is also formed vertically through its flange portion 5g with a plurality of third holes one of which is shown at 5e and fourth and threaded holes one of which is shown at 5f. The holes 5e and 5f are located so that when the female die blank 11 is properly mounted on the jig block 5 as shown in FIG. 4, they are registered with the holes 11e and 11f, respectively. Then the pins 12 are inserted into the registered holes 11e and 5e to anchor the female die blank 11 onto the jig member 5 and the bolts 13 are inserted and threaded into the registered holes 11f and 5f to clamp them together.

The male die blank 6 has vertically through its flange 6a one or more additional and threaded holes (not shown) for receiving the bolt or bolts 9. Thus, for properly clamping the cut-shaped jig member 7 onto the male die blank 6, the former is mounted on the latter with the indented rim 6f snugly fitted with the corresponding rim 7c and the bolt(s) 9 is (are) inserted through the hole(s) 7f and threaded into the additional hole(s) of the male die blank 6.

To avoid a collision of the arm 1b of the assembly 1 with the male die blank 6 and the female die blank 11 during their respective WC-EDM operations and also with the jig member 5 during its setting operation, the arm 1b properly rotated relative to the carriage 1a about an axis which should be coincident or in parallel with the axis of the wire electrode 3 traveling through the machining zone or strech 3a between the machining positioning guides 1d. To this end, a suitable rotary mechanism and carriage although not shown is provided in the carriage 1a of the electrode head assembly 1.

In operation, the first jig member 5 is securely mounted on the worktable 4 by means of any known clamp or T-form bolts, and then the male die blank 6 is securely mounted on the first jig member 5 with the pins 8 anchored in the registered holes 6d and 5c and the bolts 10 inserted and threaded into the registered holes 6e and 5d. The second jig member 7 is then mounted on the male die blank 6 with the indented annular cup end 7c snugly fitted with and seated on the correspondingly shaped outer upper rim 6f and the bolt(s) 9 from the jig 7 threaded into the male die blank 6 as shown in FIG. 1. The operation here to be conducted conveniently constitutes a final stage of the entire process of making a mating male and female die set and accordingly all of necessary heat-treatment, thermo-metallurgical and stress-removal processing and polishing procedure have advantageously been performed and completed prior to this step.

At this stage the annular bore 5a' and the annular opening 7e are arranged to be coaxial. This axis of center is shown at 0 in FIG. 2 and together with the axes of center of the pin holes 6c provides a fixed reference position for the male die bearing surface 6c' to be imparted to the male die flange 6c.

This position of the axis of center is known by inserting the end portion of the arm 1b of the electrode head assembly 1 into the opening 7e and then displacing the worktable 4 relative to the arm 1b in an X—Y plane (in the horizontal direction) until the wire electrode of stretch 3a comes in contact with the wall of the opening 7e and identifying the point of contact.

The displacement of the worktable 4 actually causes the corresponding displacements of the opening 7e and the male die flanges 6c while the axis of wire stretch 3a is held standstill. For the sake of description with reference to FIG. 2, however, the latter is assumed to be displaced relative to the opening 7e which is fixed. Assume that the axis of wire stretch 3a shown by 3a in FIG. 2 is displaced along the X axis at y1 or y2 and makes contact with the wall of the opening 7e at two positions x1 and x2. This allows the x-coordinate x0 of the axis of center 0 to be obtained as follows: $x0 = \frac{1}{2}(x1 + x2)$. Similarly, from the displacement of the axis of wire 3 along the Y-axis at x1 or x2 and its contact positions y1 and y2 with the wall of the opening 7e, the y-coordinate y0 of the axis of center 0 can be obtained as follows: $y0 = \frac{1}{2}(y1 + y2)$.

Thus, by setting the worktable 4 to this reference position (x0, y0), the desired coincidence of the wire axis 3a and the center position of the reference opering 7e is gained. The desired orientation of the male die blank 6 has been obtained by the pins 8 anchored in the reference 6d and 5c. The foregoing setting having been completed, the second jig member 7 is removed and the contour machining of the bearing die portion 6c of the male blank 6 is then conducted, as shown in FIG. 3, by the wire-cut EDM process in which the worktable 4 is displaced relative to the electrode head assembly 1 along a prescribed cutting path under numerical control while EDM machining pulses are applied from a power supply to the traveling wire electrode 3 and the male die blank 5 across the machining gap flooded with a liquid dielectric.

After this first-step shaping operation, the male die blank 6 machined is removed and the female die blank 11 on which have been done all of necessary heat-treatment, thermo-metallurgical stress-removal processing and polishing procedure is mounted securely on the first jig member 5 with the reference pins 12 anchored in the registered holes 11e and 5e and the bolts 13 inserted and threaded into the registered holes 11f and 5f as shown in FIG. 4. The female die portion 11d of the female blank 11 precisely positioned with reference to the male die portion 6c which has already been shaped, is contour-machined by the wire-cut EDM process in which the worktable 4 is displaced relative to the electrode head assembly 1 along a prescribed cutting path under numerical control while EDM machining pulses are applied from the power supply to the traveling wire electrode 3 and the female die blank 5 across the machining gap flooded with the liquid dielectric.

The male and female die blanks 6 and 11 have, as mentioned, undergone all necessary thermo-processing as well as mechanical processings and therefore, when shaped in the foregoing manner, can be immediately mounted on a common support and used for a desired mating male and female die set.

While the reference bore $5a'$ formed in the center zone of the first jig member and the flange $5g$ thereof can be used to provide the desired centering of the die blanks 6 and 11 without resort on the second jig member 7, this is not only inconvenient in operational procedures and may also cause undesirable wear of the first jig member 5 which is relatively complicated in structure and expensive. The second jig member 7 is therefore used to avoid such inconvenience and cause of trouble. It is possible to provide the bore $5a'$ with a sufficient space above the worktable 4 or to provide on the worktable 4 a recess which is slightly larger in diameter than the bore $5a'$. This enables the bore $5a'$ to be used to serve to provide a centering surface for assurance or functionally similar to the reference surface $7e$ of the second jig member 7.

There is thus provided an improved wire-cut EDM apparatus of making a hollow extrusion die set with ease, economy and due precision and finish.

What is claimed is:

1. An apparatus for sequentially making male and female die members for use as a hollow die set, from solid male and female die blanks, respectively, said die members having their respective male and female bearing surfaces spaced apart from one another in a predetermined shaped and mating relationship, from a solid male and a hollow female die blanks, respectively, said apparatus comprising:
   a wire-cut EDM electrode head assembly having a plurality of wire guide members for spanning and axially transporting a continuous wire electrode in a fixed path of generally U form at an end portion of said assembly, said path including a predetermined stretch of the axially transported wire electrode constituting an axially moving EDM wire-cutting edge for said male and female die blanks;
   a first jig member for securely and interchangeably mounting said male and female die blanks in a predetermined position thereon;
   a worktable for securely mounting said first jig member thereon, said worktable being displaceable relative to said wire-cut EDM electrode head assembly; and
   a second jig member for securely mounting on said male die blank when the latter is securely mounted on said first jig member in said predetermined position for providing a reference surface to be engaged by said predetermined stretch of the axially transported wire electrode for machining said male and female die blanks in said predetermined position.

2. The apparatus defined in claim 1 wherein said wire-cut EDM electrode head assembly includes a carriage and an arm portion rotatably mounted to said carriage about an axis coincident or in parallel with the axis of said predetermined stretch of the axially transported wire electrode, said arm having said guide members secured thereon.

3. An apparatus for making a hollow die set consisting of a male and female die members with their respective male and female die bearing surfaces spaced apart from one another in a predetermined shaped and mating relationship, from a solid male and a hollow female die blanks, respectively, said male die blank being in the form of an annular block having a base flange and a columnar boss portion centrally projected therefrom, said boss portion being formed near its top with an outwardly projected annular flange to be machined to provide said male die bearing surface, said female die blank being in the form of a cup-shaped block having a cylindrical portion extending downwardly and at its top portion an opening formed with an inwardly projected annular rim to be machined to provide said female die bearing surface, said apparatus comprising:
   a first jig member for securely and interchangeably mounting said male and female die blanks in a predetermined position thereon;
   a worktable for securely mounting said first jig member thereon;
   a wire-cut EDM electrode head assembly displaceable relative to said worktable and having a plurality of wire guide members for spanning and axially transporting a continuous wire electrode in a fixed path of generally U form at an end portion of said assembly, said path including a predetermined stretch of the axially transported wire electrode constituting an axially moving EDM wire-cutting edge for machining said outwardly projected annular flange to provide said male die bearing surface and for machining said inwardly projected annular rim to provide said female die bearing surface; and
   a second jig member for securely mounting on said male die blank when the latter is securely mounted on said first jig member in said predetermined position for providing a reference surface to be engaged by said predetermined stretch of the axially transported wire electrode for machining said outwardly projected annular flange in said male die blank and said inwardly projected annular rim in said female die blank in said predetermined position.

4. The apparatus defined in claim 3 wherein said first jig member includes a disk- or plate-form base and a central projection and said second jig member is in the form of a cup-shaped block having a cylindrical portion extending downwardly and at its top portion an annular opening defined by a circular wall constituting said reference surface, the upper rim of said projection of the first jig member being shaped to be snugly fitted with the lower end of the cylinder of said second jig member and with the lower end of the cylinder of said female die blank.

5. An apparatus for making a hollow die set consisting of a male and female die members with their respective male and female die bearing surfaces spaced apart from one another in a predetermined shaped and mating relationship, from a solid male and a hollow female die blanks, respectively, said male die blank being in the form of an annular block having a base flange and a columnar boss portion centrally projected therefrom, said boss portion being formed near its top with an outwardly projected annular flange to be machined to provide said male die bearing surface, said female die blank being in the form of a cup-shaped block having a cylindrical portion extending downwardly and at is top portion an opening formed with an inwardly projected annular rim to be machined to provide said female die bearing surface, said base flange of the male die blank having an upper rim shaped to be snugly fitted with a lower end of said cylindrical portion of the female die blank, said apparatus comprising:
   a first jig member for securely and interchangeably mounting said male and female die blanks in a predetermined position thereon, said first jig member including a disk- or plate form base and a central projection, a worktable for securely mounting said first jig member thereon;

a wire-cut EDM electrode head assembly displaceable relative to said workpiece and having a plurality of wire guide members for spanning and axially transporting a continuous wire electrode in a fixed path of generally U form at an end portion of said assembly, said path including a predetermined stretch of the axially transported wire electrode constituting an axially moving EDM wire-cutting edge for machining said outwardly projected annular flange to provide said male die bearing surface and for machining said inwardly projected annular rim to provide said female die bearing surface; and a second jig member for securely mounting on said male die blank when the latter is securely mounted on said first jig member in said predetermined position for providing a reference surface to be engaged by said predetermined stretch of the axially transported wire electrode for machining said outwardly projected annular flange in said male die blank and said inwardly projected annular rim in said female die blank in said predetermined position, said second jig member being in the form of a cup-shaped block having a cylindrical portion extending downwardly and at its top portion an annular opening defined by a circular wall constituting said reference surface, said central projection of the first jig member having an upper rim shaped to be snugly fitted with a lower end of said cylindrical portion of the second jig member and with said lower end of the cylindrical portion of said female die blank, said lower end of the cylindrical portion of said second jig member being snugly fitted with said upper rim of the flange of said male die blank.

6. The apparatus defined in claim 5 wherein said first jig member is formed vertically through said projection with at least one first hole and said male die blank is formed vertically through its flange portion with at least one second hole, said first and second holes being adapted to be registered with each other and anchored together by a pin.

7. The apparatus defined in claim 6 wherein said first jig member is formed vertically through its base portion with at least one further first hole and said female die blank is formed vertically through its cylindrical portion with at least one third pole, said further first hole and said third hole being adapted to be registered with each other and anchored together by a further pin.

* * * * *